(12) United States Patent
Takeuchi et al.

(10) Patent No.: US 12,199,323 B2
(45) Date of Patent: Jan. 14, 2025

(54) FUEL CELL SYSTEM AND EQUIPMENT MANAGEMENT METHOD

(71) Applicant: KYOCERA Corporation, Kyoto (JP)

(72) Inventors: Shoma Takeuchi, Yokohama (JP); Masahiro Baba, Kawasaki (JP); Shinji Aikawa, Yamato (JP)

(73) Assignee: KYOCERA CORPORATION, Kyoto (JP)

( * ) Notice: Subject to any disclaimer, the term of this patent is extended or adjusted under 35 U.S.C. 154(b) by 0 days.

(21) Appl. No.: 16/767,115

(22) PCT Filed: Nov. 21, 2018

(86) PCT No.: PCT/JP2018/042957
§ 371 (c)(1),
(2) Date: May 27, 2020

(87) PCT Pub. No.: WO2019/107240
PCT Pub. Date: Jun. 6, 2019

(65) Prior Publication Data
US 2020/0373596 A1 Nov. 26, 2020

(30) Foreign Application Priority Data
Nov. 28, 2017 (JP) ................................ 2017-228325

(51) Int. Cl.
H01M 8/04955 (2016.01)
H01M 8/04303 (2016.01)
H01M 8/04664 (2016.01)

(52) U.S. Cl.
CPC ... *H01M 8/04955* (2013.01); *H01M 8/04303* (2016.02); *H01M 8/04664* (2013.01)

(58) Field of Classification Search
CPC ... H01M 8/04; H01M 8/04082–04228; H01M 8/04246; H01M 8/04298–04303; H01M 8/04313–04686; H01M 8/04955
See application file for complete search history.

(56) References Cited

U.S. PATENT DOCUMENTS

| 8,067,123 B2 | 11/2011 | Kumada et al. | |
|---|---|---|---|
| 2005/0019627 A1* | 1/2005 | Ozeki | H01M 8/04022 429/413 |
| 2006/0153687 A1* | 7/2006 | Ishikawa | H01M 8/04089 429/513 |
| 2007/0072023 A1* | 3/2007 | Nakamura | G06F 1/1632 429/429 |
| 2009/0208786 A1* | 8/2009 | Manabe | H01M 8/04223 429/415 |
| 2010/0291451 A1 | 11/2010 | Tamura et al. | |

(Continued)

FOREIGN PATENT DOCUMENTS

| JP | H6169493 A | 6/1994 |
|---|---|---|
| JP | 2005182399 A | 7/2005 |

(Continued)

*Primary Examiner* — Jonathan Crepeau
*Assistant Examiner* — Jacob Buchanan
(74) *Attorney, Agent, or Firm* — HAUPTMAN HAM, LLP

(57) ABSTRACT

A fuel cell system comprises an interface configured to receive a user operation toward the fuel cell system, and a controller configured to perform a predetermined process related to a reception stop of the user operation at least during a period from a start to an end of a stop operation of the fuel cell system.

16 Claims, 7 Drawing Sheets

(56) References Cited

U.S. PATENT DOCUMENTS

2012/0021313 A1 1/2012 Yasuda et al.
2015/0200409 A1 7/2015 Nakamura

FOREIGN PATENT DOCUMENTS

| JP | 2006236615 A | 9/2006 |
| JP | 2007109463 A | 4/2007 |
| JP | 200937770 A | 2/2009 |
| JP | 200943581 A | 2/2009 |
| JP | 2009140748 A | 6/2009 |
| JP | 2011175816 A | 9/2011 |
| JP | 2013191383 A | 9/2013 |
| JP | 201739627 A | 2/2017 |

* cited by examiner

FIG. 6

| HEADER | STOP TYPE | MASK TYPE | INSTRUCTION OPERATION |
|---|---|---|---|

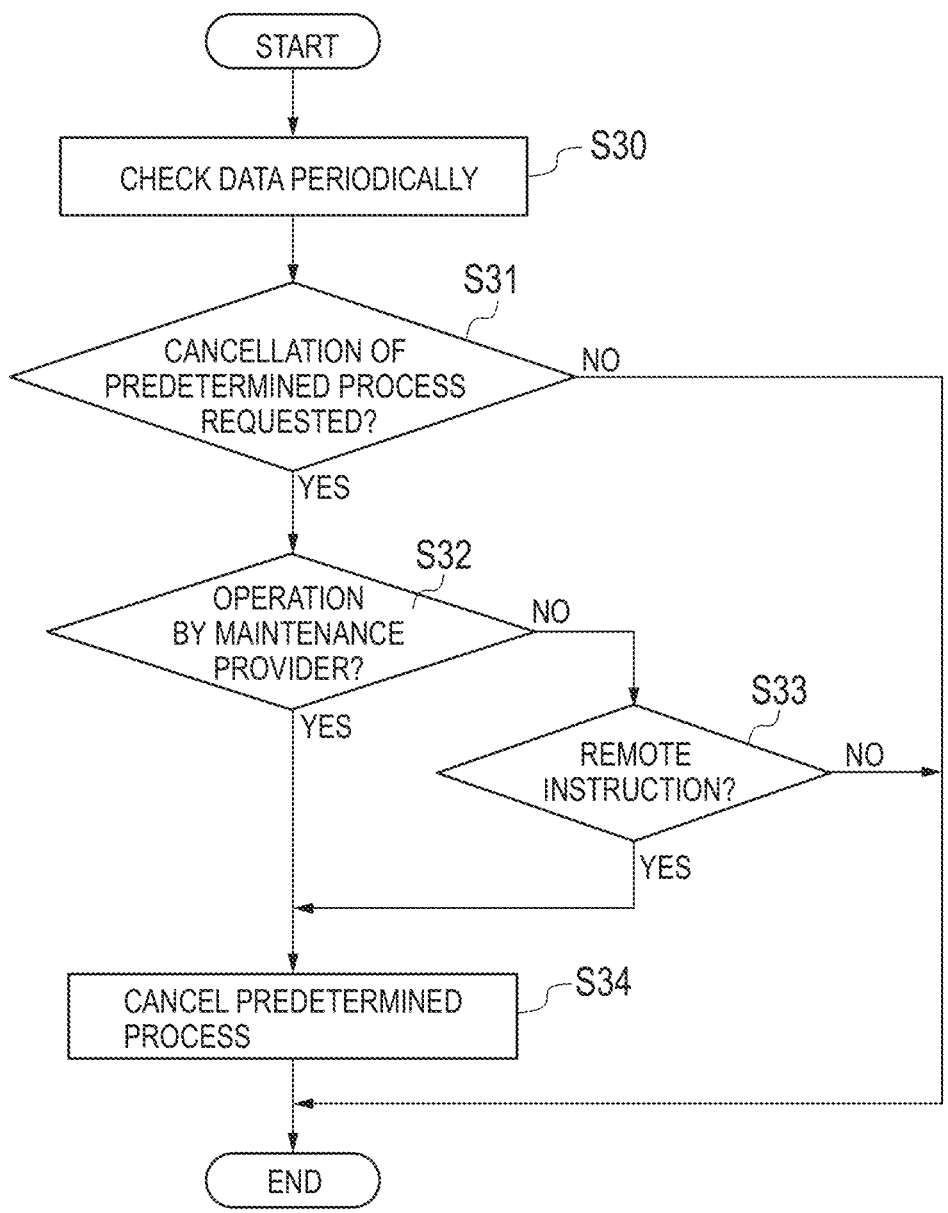

FUEL CELL SYSTEM AND EQUIPMENT MANAGEMENT METHOD

RELATED APPLICATIONS

The present application is a National Phase of International Application No. PCT/JP2018/042957, filed Nov. 21, 2018, and claims priority based on Japanese Patent Application No. 2017-228325, filed Nov. 28, 2017.

TECHNICAL FIELD

The present invention relates to a fuel cell system and an equipment management method.

BACKGROUND ART

An equipment management system that manages various information related to a plurality of equipment is known. The various information includes basic information and maintenance information on the equipment. The basic information includes, for example, an installation date, a predetermined service life, a rated power consumption, and the like. The maintenance information includes a maintenance history of the equipment (for example, Patent Literature 1).

CITATION LIST

Patent Literature

Patent Literature 1: Japanese application publication No. 2005-182399

SUMMARY OF INVENTION

A fuel cell system according to a first feature comprises an interface configured to receive a user operation toward the fuel cell system, and a controller configured to perform a predetermined process related to a reception stop of the user operation at least during a period from a start to an end of a stop operation of the fuel cell system.

An equipment management method according to a second feature comprises a step A of receiving a user operation toward a fuel cell system, and a step B of performing a predetermined process related to a reception stop of the user operation at least during a period from a start to an end of a stop operation of the fuel cell system.

BRIEF DESCRIPTION OF DRAWINGS

FIG. 6 is a diagram illustrating a message format according to a second modification.

FIG. 7 is a diagram illustrating an equipment management method according to a third modification.

DESCRIPTION OF EMBODIMENTS

There is a case where the equipment managed by the equipment management system described in the background art is a fuel cell system. A fuel cell system is a system that can be operated by a user.

Therefore, in a case where the management apparatus that manages the equipment management system instructs the stop and restart of the fuel cell system by remote control, there is a possibility that the user may perform an operation that hinders the stop operation during the stop operation of the fuel cell system.

Therefore, the embodiment provides a fuel cell system and an equipment management method that can suppress an inappropriate operation of a fuel cell system by a user.

Embodiments will be described below with reference to the drawings. In the following description of the drawings, the same or similar parts are denoted by the same or similar reference symbols.

However, it should be noted that the drawings are schematic, and ratios of dimensions may be different from actual ones. Therefore, specific dimensions and the like should be determined in consideration of the following description. Moreover, it is a matter of course that there may be portions where dimensional relationships or proportions are different among the drawings.

Embodiments (Equipment Management System)

Figure 1:
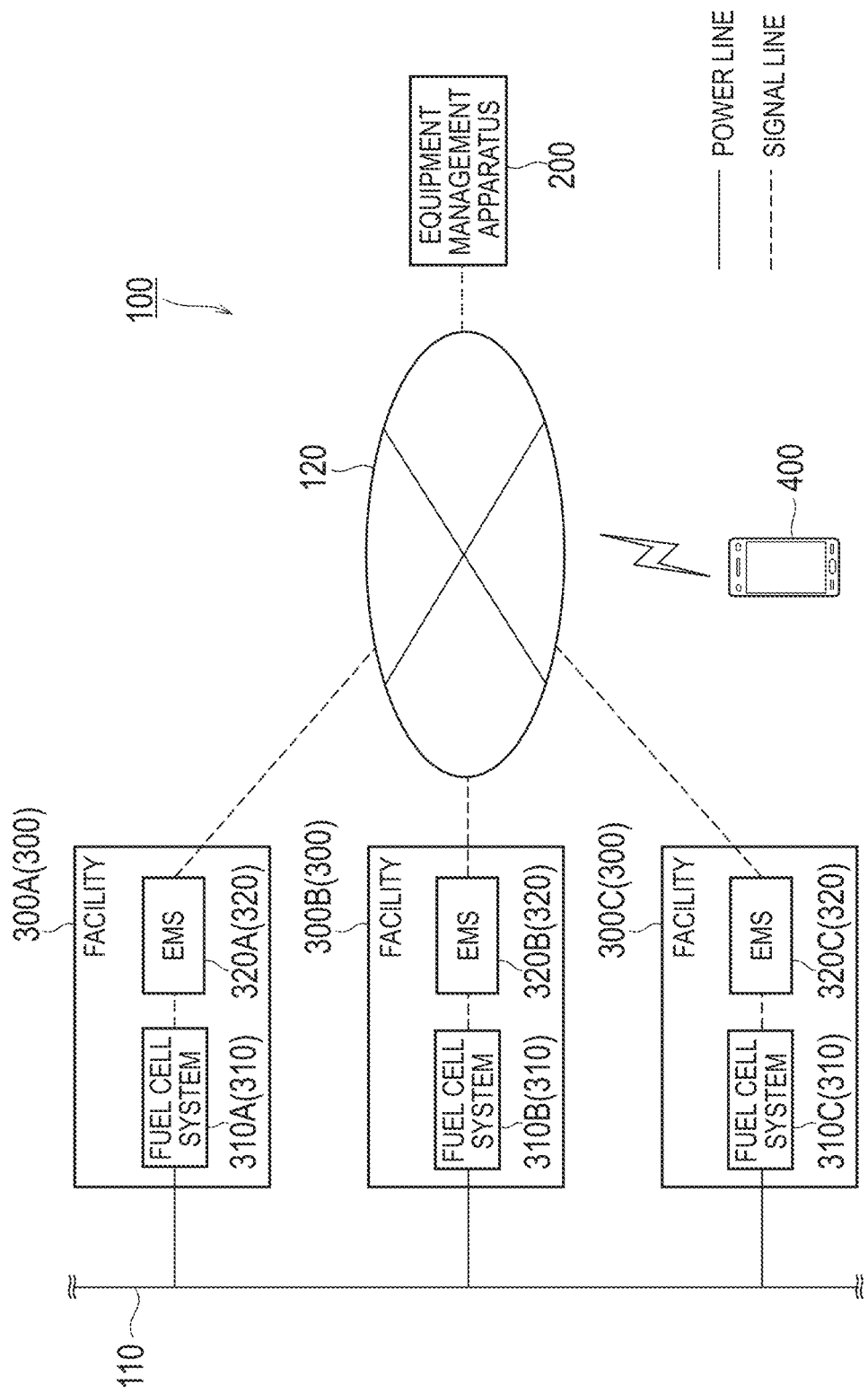
FIG. 1 is a diagram illustrating an equipment management system 100 according to an embodiment.

Hereinafter, an equipment management system according to an embodiment will be described. As illustrated in FIG. 1, an equipment management system 100 includes an equipment management apparatus 200, a facility 300, and a predetermined terminal 400. In FIG. 1, the facility 300A to the facility 300C are illustrated as the facility 300. The equipment management apparatus 200 and the facility 300 are connected to a network 120. The network 120 provides a line (wide area network) between the equipment management apparatus 200 and the facility 300 (specifically, a router provided in the facility 300). The network 120 may provide a line between the equipment management apparatus 200 and the predetermined terminal 400. The network 120 may be, for example, the Internet or a mobile communication network. The network 120 may provide a dedicated line such as a VPN. The network 120 may be regarded as an out-of-home network in the sense of providing a line for communicating with an apparatus provided outside the facility 300.

The equipment management apparatus 200 manages an equipment provided in the facility 300. Details of the equipment management apparatus 200 will be described later (see FIG. 3).

The facility 300 includes a fuel cell system 310 and an EMS 320. The fuel cell system 310 includes an equipment that generates power using a fuel gas. Details of the fuel cell system 310 will be described later (see FIG. 2). The EMS 320 is an equipment (Energy Management System) that controls the equipment provided in the facility 300. Here, the line between the fuel cell system 310 and the EMS 320 is provided by a narrow area network. For example, the narrow area network is a network configured by a router provided in the facility 300. The narrow area network may be a short distance communication network such as Bluetooth (registered trademark) and Wi-SAN. The narrow area network may be regarded as a home network in the sense of providing a line for communicating with the apparatus provided in the facility 300. However, the apparatus provided in the facility 300 may not be provided indoors of the facility 300, and may be provided on the site of the facility 300.

The facility 300 may include a load equipment that consumes power. For example, the load equipment is an air conditioning equipment, a lighting equipment, an audio visual (AV) equipment, or the like. The facility 300 may have a distributed power supply other than the fuel cell system 310. For example, the distributed power supply may include an equipment that generates power using natural energy such as sunlight, wind or geothermal, or may include a storage battery equipment.

The predetermined terminal 400 may be a terminal possessed by an administrator who manages the equipment provided in the facility 300. The predetermined terminal 400 may be a terminal possessed by a worker who performs maintenance of the equipment provided in the facility 300. The predetermined terminal 400 may be a terminal belonging to a business operator such as a power generation business, a power transmission and distribution business, or a retail business. The predetermined terminal 400 may be a terminal belonging to a user who uses the fuel cell system 310. The predetermined terminal 400 may be a smartphone, a tablet terminal, or a personal computer. The predetermined terminal 400 may be regarded as an example of a management apparatus connected to the fuel cell system 310 via at least one of the narrow area network and the wide area network.

Here, the equipment management system 100 may include a power management server. For example, the power management server transmits, to the facility 300, a power flow control message requesting control of the power flow amount from a power grid 110 to the facility 300, a reverse power flow control message requesting control of the reverse power flow amount from facility 300 to the power grid 110, and a power control message requesting control of the fuel cell system 310 (distributed power supply) provided in the facility 300.

In the embodiment, the equipment management apparatus 200 is an example of a management apparatus connected to the fuel cell system 310 via the wide area network. The EMS 320 is an example of a management apparatus connected to the fuel cell system 310 via the narrow area network.

(Fuel Cell System)

Figure 2:
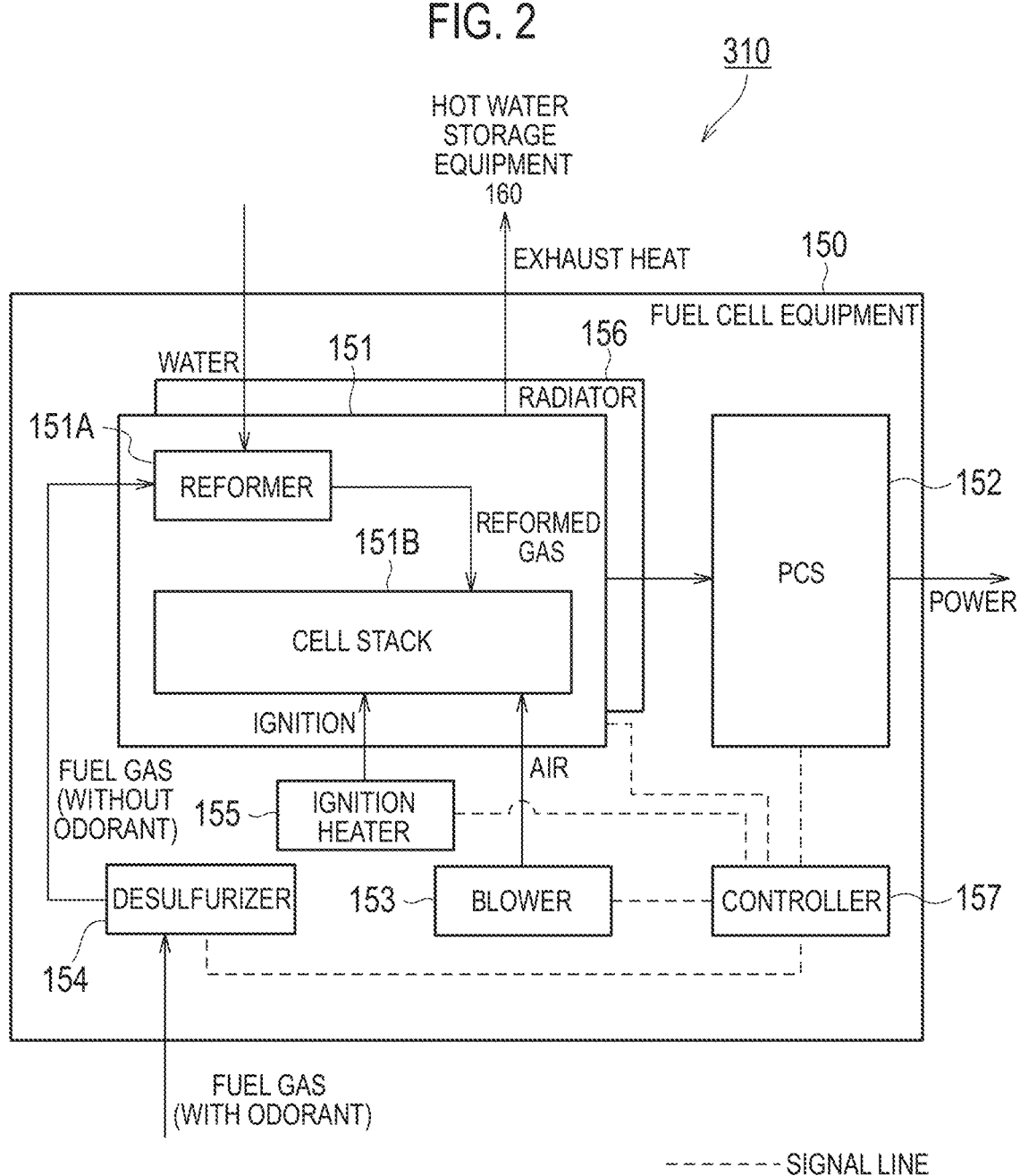
FIG. 2 is a diagram illustrating a fuel cell system 310 according to an embodiment.

Hereinafter, the fuel cell system according to the embodiment will be described. FIG. 2 is a diagram illustrating a fuel cell system 310 according to the embodiment. The fuel cell system 310 includes at least a fuel cell equipment 150. Fuel cell system 310 may include a hot water storage equipment 160. Here, the description is continued on the assumption that the fuel cell system 310 is a cogeneration system including both the fuel cell equipment 150 and the hot water storage equipment 160. Further, fuel cell system 310 may be a monogeneration system that does not include the hot water storage equipment 160.

The fuel cell equipment 150 is an equipment that generates power using a fuel gas. The hot water storage equipment 160 is an equipment that generates hot water using a fuel gas or maintains water temperature. In particular, the hot water storage equipment 160 has a hot water storage tank, and the water supplied from the hot water storage tank is heated by heat generated by combustion of fuel or waste heat generated by power generation of the fuel cell equipment 150, and the heated hot water is returned to the hot water storage tank.

As illustrated in FIG. 2, the fuel cell equipment 150 includes a fuel cell 151, a PCS 152, a blower 153, a desulfurizer 154, an ignition heater 155, a radiator 156, and a controller 157.

The fuel cell 151 is an equipment that generates power using a fuel gas. Specifically, the fuel cell 151 has a reformer 151A and a cell stack 151B.

The reformer 151A generates a reformed gas from the fuel from which the odorant has been removed by the desulfurizer 154 described later. The reformed gas is a gas composed of hydrogen and carbon monoxide.

The cell stack 151B generates power by a chemical reaction between air (oxygen) supplied from the blower 153 described later and the reformed gas. Specifically, the cell stack 151B has a structure in which a plurality of cells is stacked. Each cell has a structure in which an electrolyte is sandwiched between a fuel electrode and an air electrode. The fuel electrode is supplied with the reformed gas (hydrogen), and the air electrode is supplied with air (oxygen). A chemical reaction of the reformed gas (hydrogen) and the air (oxygen) occurs in the electrolyte to generate electric power (DC electric power) and heat.

The PCS 152 is an equipment (Power Conditioning System) that converts DC power output from the fuel cell 151 into AC power.

The blower 153 supplies air to the fuel cell 151 (cell stack 151B). For example, the blower 153 is configured by a fan. The blower 153 cools the cell stack 151B so that the temperature of the cell stack 151B does not exceed the upper limit of the allowable temperature.

The desulfurizer 154 removes the odorant contained in the fuel gas supplied from the outside. The fuel gas may be city gas or propane gas.

The ignition heater 155 is a heater that ignites the fuel gas that has not chemically reacted in the cell stack 151B (hereinafter, unreacted gas), and maintains the temperature of the cell stack 151B at a high temperature. That is, the ignition heater 155 ignites the unreacted gas leaking from the opening of each cell constituting the cell stack 151B. It should be noted that the ignition heater 155 is only required to ignite the unreacted gas in the case where the unreacted gas is not burning (for example, when starting the fuel cell equipment 150). After the combustion of the unreacted gas starts, the temperature of the cell stack 151B is maintained at a high temperature by continuous combustion of the unreacted gas that gradually overflows from the cell stack 151B.

The radiator 156 cools the reflux water so that the temperature of the water (hereinafter, reflux water) flowing from the hot water storage equipment 160 to the fuel cell equipment 150 does not exceed the upper limit of the allowable temperature. The radiator 156 may cool the cell stack 151B so that the temperature of the cell stack 151B does not exceed the upper limit of the allowable temperature.

The controller 157 is a circuit that controls the fuel cell 151, the PCS 152, the blower 153, the desulfurizer 154, the ignition heater 155, and the controller 157.

The reformer 151A, the blower 153, the desulfurizer 154, the ignition heater 155, and the controller 157 are an example of auxiliaries that assists the operation of the cell stack 151B. Further, part of the PCS 152 may be treated as an auxiliary.

The operation state of the fuel cell system 310 includes a power generation state (also referred to as power generated), a stopped state (also referred to as stopped), a start state (also referred to as started), a stop operation state (also referred to as stop operated), an idle state (also referred to as idled), and the like.

The power generation state is a state in which power generation by the fuel cell 151 is being performed. The start state is a state from a stop state to a power generation state. The stopped state is a state in which the operation of the fuel cell 151 is stopped. The stop operation state is a state from a power generation state to a stop state. The idle state is a state where although no power is output from the fuel cell system 310, the temperature of the cell stack 151B is maintained at a predetermined temperature. The predetermined temperature may be about the same as the power generation temperature of the cell stack 151B in the power generation state (for example, 650° C. to 1000° C.), or may be lower than the power generation temperature (for example, 450° C. to 600° C.). In the idle state, the power of the auxiliaries may be covered by the power output from the fuel cell 151, may be covered by power supplied from another distributed power supply (e.g., an equipment that generates power using natural energy or a storage battery equipment), or may be covered by power supplied from the power grid 110.

In the example illustrated in FIG. 2, the controller 157 is provided in the fuel cell equipment 150. However, the embodiment is not limited to this. The fuel cell system 310 includes a remote controller that is an example of an interface that receives a user operation on the fuel cell system 310, and the controller 157 may be provided in the remote controller. Alternatively, the function of the controller 157 may be implemented by both the controller 157 provided in the fuel cell equipment 150 and the remote controller. Further, controller 157 may be regarded as part of the PCS 152.

In the embodiment, the controller 157 includes a memory, a CPU, and the like, and performs a predetermined process related to stopping reception of a user operation at least during the period from the start to the end of the stop operation of the fuel cell system 310. Here, the predetermined process may be a mask process of stopping a reception of a user operation. The predetermined process may be a notification process of notifying the user that the reception of the user operation has been stopped. The predetermined process may be a notification process of notifying the user that the stop operation of the fuel cell system 310 is being performed. The notification process may be a process performed in response to the reception of the user operation, or may be a process performed without receiving the user operation. Further, the predetermined process may be a notification process of notifying a user of a time required from the start until the end of the stop operation of the fuel cell system 310. Further, the predetermined process may be a notification process of notifying the user of the remaining time required until the end of the stop operation of the fuel cell system 310. Also, the fact that the stop operation of the fuel cell system 310 is being performed may include the elapsed time from the start of the stop operation of the fuel cell system 310 until the present time with respect to the time required from the start until the end of the stop operation of the fuel cell system 310, or may include the remaining time required until the end of the stop operation of the fuel cell system 310 with respect to the time required from the start until the end of the stop operation of the fuel cell system 310. Further, the fact that the stop operation of the fuel cell system 310 is being performed may be notified as an absolute value, and when the time required from the start to the end of the stop operation of the fuel cell system 310 is 100%, may be the ratio of the elapsed time from the start of the stop operation of the fuel cell system 310 until the present time or/and the ratio of the remaining time required until the end of the stop operation of the fuel cell system 310 to the time required from the start until the end of the stop operation of the fuel cell system 310. Further, the predetermined process may include at least one of a mask process and a notification process.

In such a case, the controller 157 may perform the above-described predetermined process when the stop operation of the fuel cell system 310 is a remote stop operation. The remote stop operation is an operation performed by an instruction from the management apparatus that manages the fuel cell system 310 (here, the equipment management apparatus 200). In other words, controller 157 may not perform the above-described predetermined process when the stop operation of the fuel cell system 310 is a user operation.

(Equipment Management Apparatus)

Figure 3:
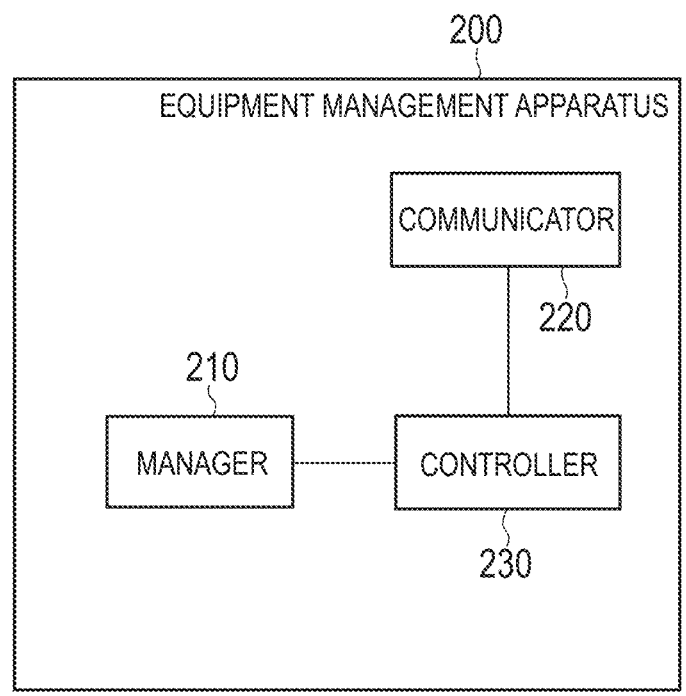
FIG. 3 is a diagram illustrating an equipment management apparatus 200 according to an embodiment.

Hereinafter, the equipment management apparatus according to the embodiment will be described. As illustrated in FIG. 3, the equipment management apparatus 200 includes a management unit 210, a communicator 220, and a controller 230.

The management unit 210 is configured by a storage medium such as a nonvolatile memory and/or an HDD, and manages information on a plurality of facilities 300.

The management unit 210 may store basic information of the equipment provided in each of the plurality of facilities 300. For example, the management unit 210 stores a facility name, a facility ID, an equipment name, an equipment ID, an introduction year, an age, and a service life in association with each other. The facility name is a name of the facility 300 where the equipment is installed. The facility ID is an identifier for identifying the facility 300. The equipment name is the name of the equipment. The equipment ID is an identifier for identifying the equipment. The introduction year is a year when the equipment was introduced. The age is a yearly time period that has elapsed since the equipment was introduced. The service life is determined by the manufacturer of the equipment or the like, and is information indicating a period in which the equipment can be used properly after the equipment is introduced.

The management unit 210 may store maintenance information of the equipment provided in each of the plurality of facilities 300 for each of the plurality of facilities 300. For example, the management unit 210 stores a facility name, an equipment name, a maintenance date, a maintenance summary, and maintenance details in association with each other. The management unit 210 may store the facility ID and the equipment ID in association with these pieces of information. The equipment name and the facility name are as described above. The maintenance date is a date when the maintenance was performed. The maintenance summary is information indicating a summary of the maintenance, and the maintenance details are information indicating details of the maintenance. The maintenance information according to the embodiment only needs to include at least a maintenance period (plan) during which the equipment maintenance is performed in the future. The maintenance information may include a maintenance period during which the equipment maintenance was performed in the past.

For example, the maintenance includes inspection for investigating the deterioration state of the equipment, maintenance for performing minor care at the time of inspection, repair for treating a malfunction of the equipment, replacement for replacing an existing equipment with a new equipment, and the like.

The communicator 220 is configured by a communication module, and communicates with the facility 300 and the predetermined terminal 400 via the network 120. The communicator 220 may transmit a message to the fuel cell system 310.

The controller 230 includes a memory, a CPU, and the like, and controls each component provided in the equipment management apparatus 200. The controller 230 may perform control to arrange maintenance of the fuel cell system 310 based on the state of the fuel cell system 310.

(Equipment Management Method)

Hereinafter, an equipment management method according to the embodiment will be described. The flow illustrated in FIG. 4 is a flow related to the performance of a predetermined process, and is a flow performed at a constant cycle.

Figure 4:
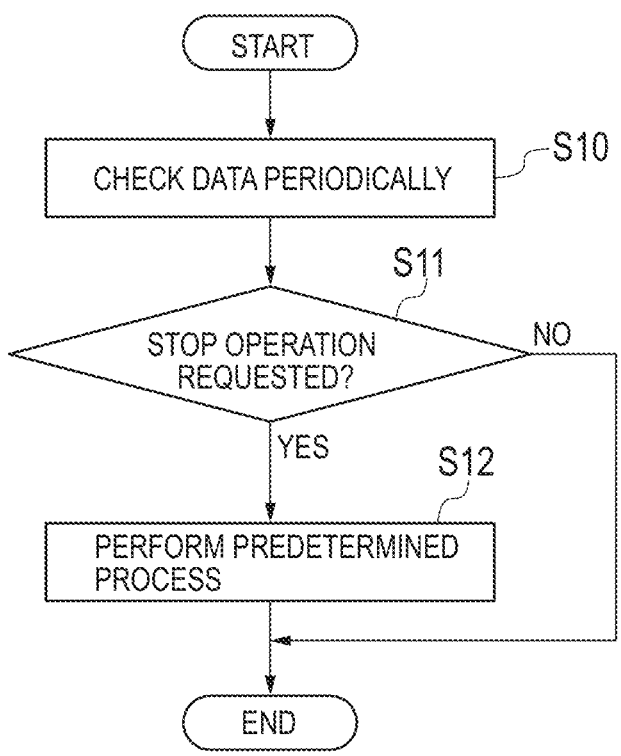
FIG. 4 is a diagram illustrating an equipment management method according to an embodiment.

As illustrated in FIG. 4, in step S10, the controller 157 periodically checks a command acquired by the remote controller. The command acquired by the remote controller may be a command accompanying a user input, or may be a command accompanying an instruction from the equipment management apparatus 200.

In step S11, the controller 157 determines whether a stop operation has been requested in the process of step S10. The controller 157 performs the process of step S12 when the determination result is YES. The controller 157 ends the series of processes when the determination result is NO.

Here, the controller 157 may determine whether the stop operation of the fuel cell system 310 is a remote stop operation. In such a case, the controller 157 performs the process of step S12 when the stop operation of the fuel cell system 310 is a remote stop operation. The controller 157 ends the series of processes when the stop operation of fuel cell system 310 is not a remote stop operation.

In step S12, the controller 157 performs a predetermined process including at least one of the mask process and the notification process.

(Function and Effect)

In the embodiment, the fuel cell system 310 performs a predetermined process related to the reception stop of a user operation during the period from the start to the end of the stop operation of the fuel cell system 310. According to such a configuration, as in a user operation that hinders the stop operation of the fuel cell system 310, an inappropriate operation of the fuel cell system 310 by a user can be suppressed.

[First Modification]

In the following, a first modification of the embodiment will be described. In the following, differences with respect to the embodiment will be mainly described.

In particular, in the embodiment, as a condition for determining whether the fuel cell system 310 performs a predetermined process, an example is given of whether the stop operation of the fuel cell system 310 is a remote stop operation. In the first modification, a variation of the condition under which whether the fuel cell system 310 performs the predetermined process is determined will be described.

In the first modification, unless the stop operation of the fuel cell system 310 is canceled within a predetermined time (for example, 10 seconds), the fuel cell system 310 (controller 157) performs the above-described predetermined process. In other words, when the stop operation of the fuel cell system 310 is canceled within a predetermined time (for example, 10 seconds), the fuel cell system 310 (controller 157) may not perform the above-described predetermined process. According to such a configuration, it is possible to suppress an improper operation by the user while permitting cancellation of an erroneous stop operation.

In the first modification, fuel cell system 310 (controller 157) performs the above-described predetermined process when the stop operation of the fuel cell system 310 is a leak detection avoidance operation. According to such a configuration, a situation in which the leak detection avoidance operation is prevented by an inappropriate operation by the user is suppressed.

Generally, a gas meter connected to the fuel cell system 310 detects gas leakage when the gas usage time exceeds a predetermined value. Further, the gas meter connected to the fuel cell system 310 may detect gas leakage when the gas usage exceeds a predetermined value.

Under these assumptions, the leak detection avoidance operation is an operation to stop the fuel cell system 310 in order to avoid a situation in which a gas leak is erroneously detected even though the gas is not leaked due to a continuous supply of the gas to the fuel cell system 310. That is, in order to avoid erroneous gas leak detection by the gas meter connected to the fuel cell system 310, the operation of the fuel cell system 310 is stopped. Such a leak detection avoidance operation is performed at a predetermined cycle (for example, one month).

(Equipment Management Method)

Hereinafter, an equipment management method according to the first modification will be described. The flow illustrated in FIG. 5 is a flow related to the performance of the predetermined process, and is a flow performed at a constant cycle.

Figure 5:
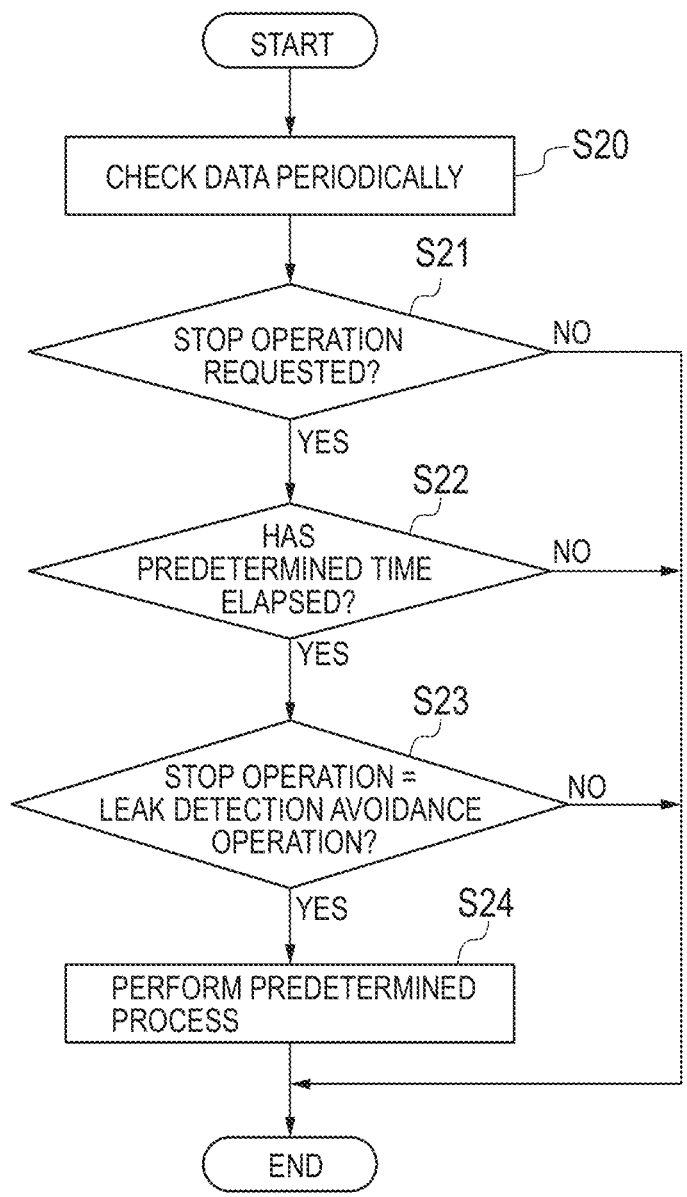
FIG. 5 is a diagram illustrating an equipment management method according to a first modification.

As illustrated in FIG. 5, in step S20, the controller 157 periodically checks a command acquired by the remote controller. The command acquired by the remote controller may be a command accompanying a user input, or may be a command accompanying an instruction from the equipment management apparatus 200.

In step S21, the controller 157 determines whether a stop operation has been requested in the process of step S20. The controller 157 performs the process of step S22 when the determination result is YES. The controller 157 ends the series of processes when the determination result is NO.

Here, the controller 157 may determine whether the stop operation of the fuel cell system 310 is a remote stop operation. In such a case, the controller 157 performs the process of step S22 when the stop operation of the fuel cell system 310 is a remote stop operation. The controller 157 ends the series of processes when the stop operation of fuel cell system 310 is not a remote stop operation.

In step S22, the controller 157 determines whether a predetermined time (for example, 10 seconds) has elapsed since the stop operation was requested. The controller 157 performs the process of step S23 when the determination result is YES. The controller 157 ends the series of processes when the determination result is NO.

In step S23, the controller 157 determines whether the stop operation of fuel cell system 310 is a leak detection avoidance operation. The controller 157 performs the process of step S24 when the determination result is YES. The controller 157 ends the series of processes when the determination result is NO.

Here, whether the stop operation of the fuel cell system 310 is a leak detection avoidance operation may be determined based on whether the difference between the time at which the gas leak detection is started and the current time is within a predetermined time. That is, when the difference is within a predetermined time, the controller 157 may determine that the stop operation of the fuel cell system 310 is a leak detection avoidance operation. The controller 157 may determine that the stop operation of the fuel cell system 310 is not the leak detection avoidance operation when the difference is other than the predetermined time.

In step S24, the controller 157 performs a predetermined process including at least one of the mask process and the notification process.

In the flow illustrated in FIG. 5, at least one of step S22 and step S23 may be omitted. That is, even when the predetermined time has not elapsed since the stop operation was requested, the controller 157 may perform a predetermined process when the stop operation of the fuel cell system 310 is the leak detection avoidance operation. Similarly, even when the stop operation of the fuel cell system 310 is not a leak detection avoidance operation, the controller 157 may perform a predetermined process when a predetermined time has elapsed since the stop operation was requested.

[Second Modification]

In the following, a second modification of the embodiment will be described. In the following, differences with respect to the embodiment will be mainly described.

In particular, in the second modification, the message transmitted from the equipment management apparatus 200 to the fuel cell system 310 includes an information element indicating the type of stop of the fuel cell system 310. The fuel cell system 310 (controller 157) determines whether the stop operation of the fuel cell system 310 is a remote stop operation based on the information element.

For example, the message transmitted from the equipment management apparatus 200 to the fuel cell system 310 includes a header, a stop type, a mask type, and an operation mode as illustrated in FIG. 6. In the case illustrated in FIG. 6, the mask type may be omitted.

The header includes information indicating the source of the message and information indicating the destination of the message. The stop type is an information element indicating the type of the stop operation of the fuel cell system 310 when the instruction operation is the stop operation. For example, the type of the stop operation may be a remote stop operation or a leak detection avoidance operation. The mask type is an information element indicating whether to perform the above-described predetermined process. The instruction operation is an information element that specifies the operation of the fuel cell system 310. For example, the specified operation may be the stop operation of the fuel cell system 310, the power generation operation of the fuel cell system 310, or the operation of changing the output power of the fuel cell system 310.

When the message does not include the mask type, the fuel cell system 310 may determine whether to perform the predetermined process based on the stop type included in the message. For example, when the stop operation of the fuel cell system 310 is at least one of a remote stop operation and a leak detection avoidance operation, the fuel cell system 310 may determine that the predetermined process is performed.

When the message includes the mask type, the fuel cell system 310 may determine whether to perform the predetermined process based on the mask type. Even when the mask type is an information element to perform the predetermined process, the fuel cell system 310 may determine that the predetermined process is not performed when the stop operation of the fuel cell system 310 is not at least one of the remote stop operation and the leak detection avoidance operation. Conversely, even when the mask type is an information element not to perform the predetermined process, the fuel cell system 310 may determine that the predetermined process is performed when the stop operation of the fuel cell system 310 is at least one of the remote stop operation and the leak detection avoidance operation.

[Third Modification]

In the following, a third modification of the embodiment will be described. In the following, differences with respect to the embodiment will be mainly described.

In particular, in the third modification, the predetermined process is canceled by an operation by a maintenance company of the fuel cell system 310 or an instruction from a management apparatus (for example, the equipment management apparatus 200) that manages the fuel cell system 310. According to such a configuration, since the predetermined process is canceled by an explicit operation or an explicit instruction, it is possible to suppress the inappropriate operation by the user.

(Equipment Management Method)

Hereinafter, an equipment management method according to the third modification will be described. The flow illustrated in FIG. 7 is a flow related to the cancellation of the predetermined process, and is a flow performed at a constant cycle.

As illustrated in FIG. 7, in step S30, the controller 157 periodically checks a command acquired by the remote controller. The command acquired by the remote controller may be a command accompanying a user input, or may be a command accompanying an instruction from the equipment management apparatus 200.

In step S31, the controller 157 determines whether the cancellation of the predetermined process has been requested in the process of step S30. The controller 157 performs the process of step S32 when the determination result is YES. The controller 157 ends the series of processes when the determination result is NO.

In step S32, the controller 157 determines whether the cancellation of the predetermined process is an operation by a maintenance company. The controller 157 performs the process of step S34 when the determination result is YES. The controller 157 performs the process of step S33 when the determination result is NO.

In step S33, the controller 157 determines whether the cancellation of the predetermined process is an instruction from the equipment management apparatus 200. The controller 157 performs the process of step S34 when the determination result is YES. The controller 157 ends the series of processes when the determination result is NO.

In step S34, the controller 157 cancels the predetermined process including at least one of the mask process and the notification process.

Although not particularly mentioned in the flow illustrated in FIG. 7, the controller 157 may be configured not to cancel the predetermined process when the stop operation of the fuel cell system 310 does not end.

In the third modification, although the predetermined process is canceled by the operation by the maintenance company or the instruction from the equipment management apparatus 200, the embodiment is not limited to this. The predetermined process may be canceled when the stop operation of the fuel cell system 310 ends.

[Fourth Modification]

In the following, a fourth modification of the embodiment will be described. In the following, differences with respect to the embodiment will be mainly described.

Specifically, in the embodiment and the like, the remote stop operation and the leak detection avoidance operation are exemplified as the stop operation of the fuel cell system 310. In the fourth modification, the stop operation of the fuel cell system 310 includes a stop operation (abnormal stop operation) accompanying an abnormality of the fuel cell system 310. The fuel cell system 310 (controller 157) performs the above-described predetermined process when the stop operation of the fuel cell system 310 is an abnormal stop operation.

For example, the stop operation of the fuel cell system 310 includes a normal stop operation and an abnormal stop operation. The normal stop operation is an operation in which although power generation by the fuel cell 151 is stopped, the operation of the fuel cell system 310 is stopped while lowering the temperature of the cell stack 151B using the blower 153 or the radiator 156 without stopping the blower 153 or the radiator 156. On the other hand, the abnormal stop operation is an operation of stopping not only the power generation by the fuel cell 151 but also the entire operation of the fuel cell system 310 is stopped. The normal stop operation is, for example, an operation performed in response to a relatively minor abnormality, or an operation performed in regular maintenance of the fuel cell system 310. On the other hand, the abnormal stop operation is, for example, an operation performed in response to a relatively serious abnormality, or an operation performed in a state where the normal stop cannot be performed.

Further, the stop operation of the fuel cell system 310 includes a manual stop operation and an automatic stop operation. The manual stop operation is a stop operation caused by a user operation. The automatic stop operation is a stop operation caused by the stop function of the fuel cell system 310. The automatic stop operation is an automatic stop operation by the fuel cell system 310 without requiring the user operation. The manual stop operation includes the normal stop operation and the abnormal stop operation described above. Similarly, the automatic stop operation includes the normal stop operation and the abnormal stop operation described above. Further, the stop operation of the fuel cell system 310 may include an operation of stopping the fuel cell system 310 by remote control from the equipment management apparatus 200 (that is, the above-described remote stop operation). Such an operation may be counted as a manual stop or as an automatic stop.

The abnormal stop operation may be, for example, a stop operation performed in response to an event in which the concentration of gas in the fuel cell system 310 falls outside a predetermined range, a stop operation performed in response to an event in which the concentration of CO in the fuel cell system 310 exceeds the upper threshold, or a stop operation performed in response to an event (high temperature abnormality) in which the temperature of a component (cell stack, fuel catalyst, or the like) provided in the fuel cell system 310 exceeds the upper threshold. The gas concentration, the CO concentration, and the component temperature may be detected by sensors provided in the fuel cell system 310. The abnormal stop operation may be an automatic stop operation in which the fuel cell system 310 automatically stops according to the detection result of the sensor, or a manual stop operation in which the fuel cell system 310 is stopped by a user operation by notifying the user of the detection result of the sensor. Further, the abnormal stop operation may be, for example, a stop operation performed in response to an abnormality of a component (for example, a sensor, the blower 153, the radiator 156, or the like) provided in the fuel cell system 310. The abnormal stop operation may be an automatic stop operation in which the fuel cell system 310 automatically stops according to the result of detecting a component abnormality, or a manual stop operation in which the fuel cell system 310 is stopped by a user operation by notifying the user of the detection result of the component abnormality.

The normal stop operation is a stop operation other than the abnormal stop operation. The normal stop operation may be, for example, a stop operation performed in response to an event (low temperature abnormality) in which the temperature of a component (such as a cell stack) provided in the fuel cell system 310 falls below a lower threshold. The temperature of the component may be detected by a sensor provided in the fuel cell system 310. The normal stop operation may be an automatic stop operation in which the fuel cell system 310 automatically stops according to the detection result of the sensor, or a manual stop operation in which the fuel cell system 310 is stopped by a user operation by notifying the user of the detection result of the sensor. Further, the normal stop operation may be a stop operation performed in response to a communication abnormality. The communication abnormality may be a communication abnormality between components such as the PCS 152, the controller 157 and the remote controller provided in the fuel cell system 310, or a communication abnormality between the fuel cell system 310 and the EMS 320. The communication abnormality may be an abnormality in which a state in which communication cannot be performed continues for a predetermined time or more. The normal stop operation may be an automatic stop operation in which the fuel cell system 310 automatically stops based on a communication abnormality detection result, or a manual stop operation in which the fuel cell system 310 is stopped by a user operation by notifying the user of the communication abnormality detection result. The normal stop operation may be a stop performed in response to an abnormality of the power grid 110. The abnormality of the power grid 110 may be a power failure or an abnormality of the grid voltage and the grid frequency. The normal stop operation may be an automatic stop operation in which the fuel cell system 310 automatically stops based on the detection result of the abnormality of the power grid 110, or a manual stop operation in which the fuel cell system 310 is stopped by a user operation by notifying the user of the detection result of the abnormality in the power grid 110.

Other Embodiments

Although the present invention has been described by the embodiments described above, it should not be understood that the descriptions and the drawings that form part of this disclosure limit the present invention. From this disclosure, various alternative embodiments, examples and operational techniques will be apparent to those skilled in the art.

In the embodiment, the case where the interface that receives the user operation is a remote controller is indicated. However, the embodiment is not limited to this. The interface may be a receiving module that receives a command transmitted from an apparatus that controls the fuel cell system 310. The receiving module may be provided in the remote controller, may be provided in the controller 157, or may be provided in the PCS 152. The apparatus that controls the fuel cell system 310 may be the equipment management apparatus 200, may be the EMS 320, or may be the predetermined terminal 400.

The remote stop operation described in the embodiment may be performed according to a schedule determined in advance. The schedule may be programmed in the equipment management apparatus 200, or may be input by the operator of the equipment management apparatus 200.

The leak detection avoidance operation described in the embodiment may be performed on a schedule determined in advance. The schedule may be programmed into the fuel cell system 310, may be input by the operator of the fuel cell system 310, or may be set into the fuel cell system 310 from the equipment management apparatus 200.

In the embodiment, the management unit 210 is provided in the equipment management apparatus 200, but the embodiment is not limited to this. For example, the management unit 210 may be provided in a server connected to the equipment management apparatus 200 via the network 120.

In the embodiment, the fuel cell system 310 communicates with the equipment management apparatus 200 via the EMS 320. However, the embodiment is not limited to this. The EMS 320 may not be provided, and the fuel cell system 310 may directly communicate with the equipment management apparatus 200.

Although not specifically mentioned in the embodiment, the EMS 320 provided in the facility 300 does not necessarily have to be provided in the facility 300. For example, some of the functions of the EMS 320 may be provided by a cloud server provided on the Internet. That is, it may be regarded that a local control apparatus 360 includes a cloud server. It may be regarded that the EMS 320 is the power management server described above.

The fuel cell equipment 150 is a solid oxide fuel cell (SOFC). However, the fuel cell equipment 150 may be a polymer electrolyte fuel cell (PEFC), a phosphoric acid fuel cell (PAFC), or a molten carbonate fuel cell (MCFC).

Note that the entire contents of Japanese Patent Application No. 2017-228325 filed on Nov. 28, 2017 are incorporated by reference herein.

The invention claimed is:

1. A fuel cell system, comprising:
an interface configured to receive a user operation toward the fuel cell system; and
a controller configured to perform a predetermined process related to a reception stop of the user operation at least during a period from a start of a stop operation state to an end of the stop operation state of the fuel cell system,
wherein
the stop operation state is a state from a power generation operation state in which power generation by a fuel cell is performed to a stop state in which operation of the fuel cell including the power generation is stopped,
the predetermined process includes any one of:
notifying a user of a time required from a start until an end of a stop operation of the fuel cell system,
notifying the user of a remaining time required until the end of the stop operation of the fuel cell system, or
notifying the user of an elapsed time from the start of the stop operation of the fuel cell system,
the power generation by the fuel cell is performed at the stop operation state between the power generation operation state and the stop state,
the stop operation of the fuel cell system, which is being performed at the stop operation state, includes a remote stop operation performed by an instruction from a management apparatus configured to manage the fuel cell system,
the instruction is performed by a message from the management apparatus,
the message includes an information element indicating a type of the stop operation,
the type of the stop operation includes the remote stop operation,
the controller is configured to
determine whether the stop operation is the remote stop operation or not, a predetermined time since the stop operation is requested has elapsed or not, and the stop operation is a leak detection avoidance operation or not,
perform the predetermined process in response to determining (i) the stop operation being the remote stop operation, (ii) the predetermined time having elapsed, and (iii) the stop operation being the leak detection avoidance operation, and
not to perform the predetermined process in response to
(a) determining the stop operation being not the remote stop operation, or
(b) the predetermined time having not elapsed even though determining the stop operation being the remote operation, or
(c) the stop operation not being the leak detection avoidance operation even though determining the stop operation being the remote operation and determining the predetermined time having elapsed, and
the controller is configured to determine, in response to determining (i) the stop operation being the remote operation, whether the predetermined time has elapsed or not and whether the stop operation is the leak detection avoidance operation or not.

2. The fuel cell system according to claim 1, wherein the predetermined process further includes a mask process of stopping a reception of the user operation.

3. The fuel cell system according to claim 1, wherein the predetermined process further includes a notification process of notifying the user that a reception of the user operation has been stopped.

4. The fuel cell system according to claim 1, wherein the predetermined process further includes a notification process of notifying the user that the stop operation of the fuel cell system is being performed at the stop operation state.

5. The fuel cell system according to claim 1, wherein the remote stop operation is performed according to a schedule determined in advance.

6. The fuel cell system according to claim 1, wherein the controller is configured to perform the predetermined process unless the stop operation of the fuel cell system, which is being performed at the stop operation state, is canceled within the predetermined time.

7. The fuel cell system according to claim 1, wherein
the stop operation of the fuel cell system, which is being performed at the stop operation state, includes the leak detection avoidance operation accompanying a leak detection of a gas supplied to the fuel cell system.

8. The fuel cell system according to claim 7, wherein the leak detection avoidance operation is performed according to a schedule determined in advance.

9. The fuel cell system according to claim 1, wherein the predetermined process is canceled by an operation by a maintenance provider of the fuel cell system or an instruction from the management apparatus configured to manage the fuel cell system.

10. The fuel cell system according to claim 1, wherein the stop operation of the fuel cell system, which is being performed at the stop operation state, includes a stop operation due to an abnormality of the fuel cell system.

11. The fuel cell system according to claim 1, wherein the interface is a remote controller operated by the user.

12. The fuel cell system according to claim 1, wherein the interface is a receiving module configured to receive a command transmitted from an apparatus configured to control the fuel cell system.

13. The fuel cell system according to claim 1, wherein the controller is configured to, in response to receiving the user operation that is not the remote stop operation from the management apparatus, not perform the predetermined process.

14. The fuel cell system according to claim 1, wherein the predetermined process includes notifying the user of the elapsed time from the start of the stop operation of the fuel cell system.

15. The fuel cell system according to claim 1, wherein the controller is configured to, in response to (ii) determining the predetermined time having elapsed, determine whether the stop operation is the leak detection avoidance operation or not.

16. An equipment management method, comprising:
receiving a user operation toward a fuel cell system; and
determining whether or not to perform a predetermined process related to a reception stop of the user operation at least during a period from a start of a stop operation state to an end of the stop operation state of the fuel cell system,
wherein
the stop operation state is a state from a power generation operation state in which power generation by a fuel cell is performed to a stop state in which operation of the fuel cell including the power generation is stopped,
the predetermined process includes any one of:
notifying a user of a time required from a start until an end of a stop operation of the fuel cell system,
notifying the user of a remaining time required until the end of the stop operation of the fuel cell system, or
notifying the user of an elapsed time from the start of the stop operation of the fuel cell system,
the power generation by the fuel cell is performed at the stop operation state between the power generation operation state and the stop state,
the stop operation of the fuel cell system, which is being performed at the stop operation state, includes a remote stop operation performed by an instruction from a management apparatus configured to manage the fuel cell system,
the instruction is performed by a message from the management apparatus,
the message includes an information element indicating a type of the stop operation,
the type of the stop operation includes the remote stop operation,
the determining whether or not to perform the predetermined process comprises:
  determining whether the stop operation is the remote stop operation or not,
  determining whether a predetermined time since the stop operation is requested has elapsed or not, and
  determining the stop operation is a leak detection avoidance operation or not,
the predetermined process is performed in response to determining (i) the stop operation being the remote stop operation, (ii) the predetermined time having elapsed, and (iii) the stop operation being the leak detection avoidance operation, and
the predetermined process is not performed in response to
  (a) determining the stop operation being not the remote stop operation, or
  (b) the predetermined time having not elapsed even though determining the stop operation being the remote operation, or
  (c) the stop operation not being the leak detection avoidance operation even though determining the stop operation being the remote operation and determining the predetermined time having elapsed, and
in response to determining (i) the stop operation being the remote operation, the determining whether the predetermined time has elapsed or not and whether the stop operation is the leak detection avoidance operation or not are performed.

\* \* \* \* \*